United States Patent [19]
Schmidlin et al.

[11] 3,728,017
[45] Apr. 17, 1973

[54] SUSPENSION OF OPTICAL SYSTEM

[75] Inventors: Raymond J. Schmidlin, Lyndhurst; Richard W. Germuska, Cleveland, both of Ohio

[73] Assignee: Addressograph Multigraph Corporation, Cleveland, Ohio

[22] Filed: Feb. 14, 1972

[21] Appl. No.: 226,336

Related U.S. Application Data

[63] Continuation of Ser. No. 38,741, May 19, 1970, abandoned.

[52] U.S. Cl. ...................355/18, 248/399, 312/107, 312/350
[51] Int. Cl. ..............................................G03b 27/00
[58] Field of Search.....................248/20, 370, 399; 312/107, 350; 355/18

[56] References Cited

UNITED STATES PATENTS

| | | | |
|---|---|---|---|
| 1,103,057 | 7/1914 | Kucharski | 355/18 |
| 2,955,077 | 10/1960 | Buttke | 312/350 X |
| 3,465,997 | 9/1969 | Piske | 248/399 X |
| 3,219,400 | 11/1965 | Bergquist | 312/107 |

*Primary Examiner*—Samuel S. Matthews
*Assistant Examiner*—Michael Harris
*Attorney*—Russell L. Root et al.

[57] ABSTRACT

A copy duplicator machine is provided which has an optical apparatus, a sensitizing apparatus, a developing apparatus, and a printing apparatus. A compact rigid support structure mounts the optical apparatus on a larger and less rigid main frame support assembly. A fully yieldably means, preferably tracks, of less rigidity then the support structure, is the only operative interconnection between the main frame assembly and the support structure. Thus, distortional movement of the main frame is not transmitted as torsional movement to the support structure.

5 Claims, 5 Drawing Figures

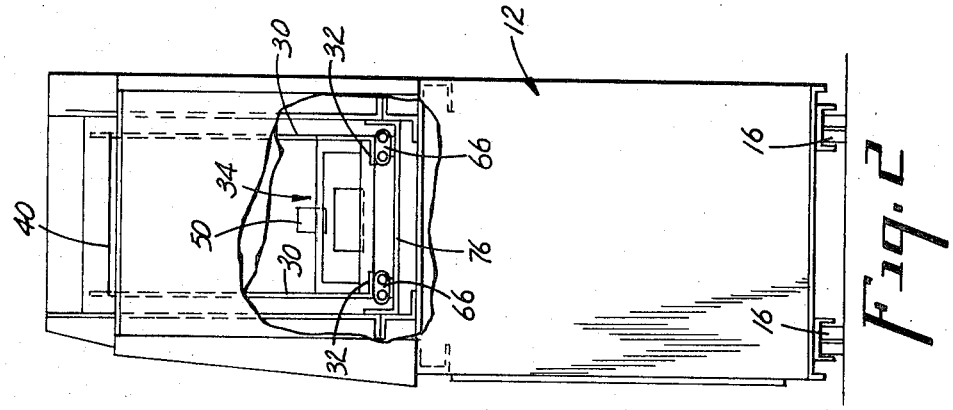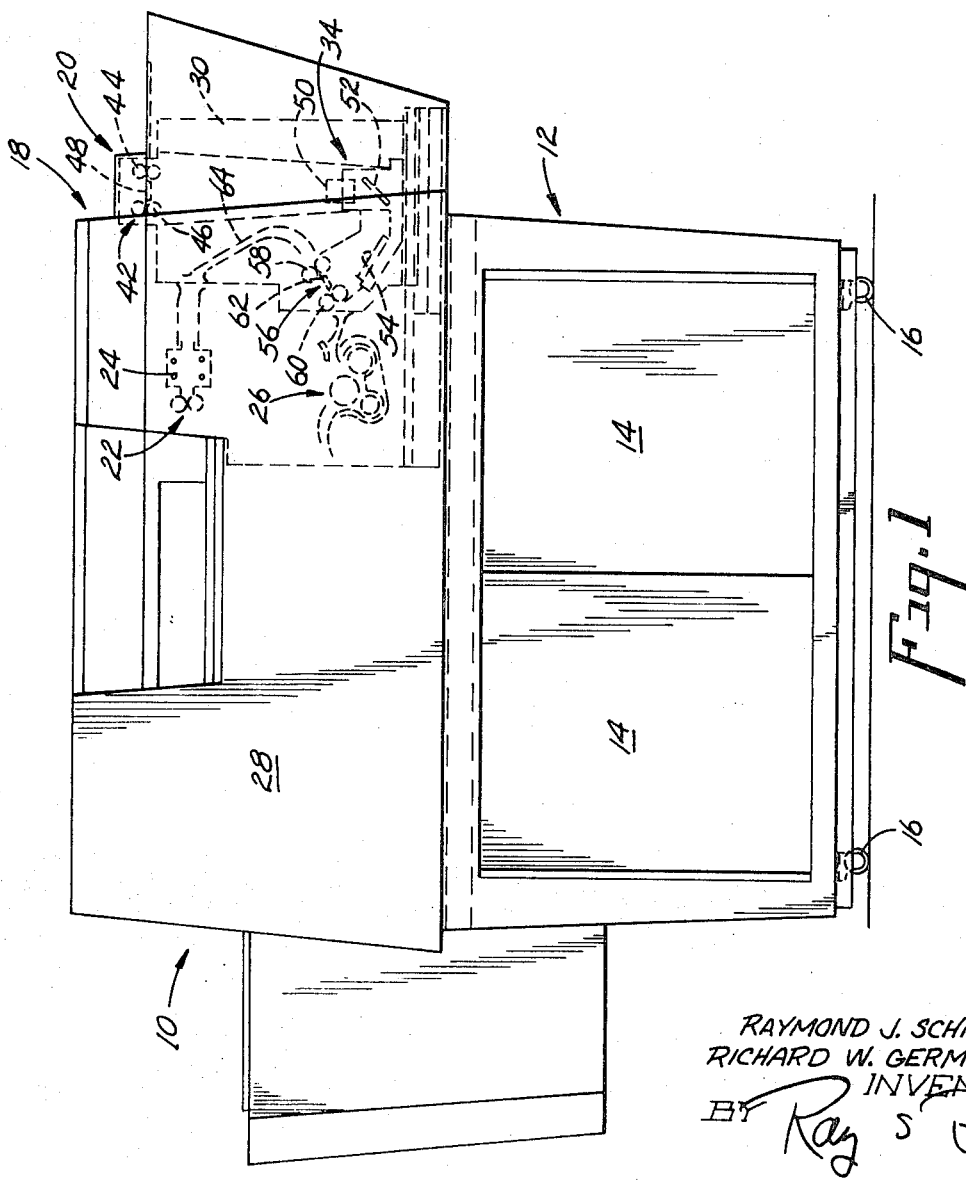

RAYMOND J. SCHMIDLIN
RICHARD W. GERMUSKA
INVENTORS

BY Ray S Pyle
ATTORNEY

SUSPENSION OF OPTICAL SYSTEM

This is a continuation, of application Ser. No. 38,471 filed May 19, 1970, now abandoned.

BACKGROUND OF THE INVENTION

This invention relates generally to the suspension of optical systems, and more particularly to the suspension of optical systems in copy duplicator machines.

In the photocopying art, one common technique of photocopying documents is to pass the original document along an object plane past a scanning station where the image thereon is sensed and projected through an optical system to a sensitized master sheet driven past an exposure station. In this type of photocopying, it is usual practice to use mirrors to bend the optical path because of the relative position of the image plane at the exposure station with respect to the object plane at the scanning station.

Such optical systems, when utilized, require precision adjustment so that an accurate, properly focused, clear image of the object to be copied is projected on the image plane at a precise location. This precision adjustment, once made, must be maintained. Even slight misalignment of the parts of the optical system can seriously affect the quality, size and location of the image, and hence such misalignment and any potential for causing misalignment must be minimized.

In a copy duplicator machine, a rather large structural frame is required to house all of the various components of the machine, including the sensitizing station, the optical system, the developer apparatus, the printing head and the storage of papers, etc. With such a large frame, movement of this frame will tend to cause a twisting or bending of the frame. Such movement of the machine occurs when the machine is delivered to the customer and also when the machine is moved from one location to another, or even moved for cleaning purposes. If this twisting movement were to be imparted to the optical system, unacceptable misalignment could occur.

While it would be possible to form the entire structural frame or cabinet of the copy duplicator machine of massive parts and extremely rigid construction, such construction would be expensive and impractical especially since such rigidity is not required for the components other than the optical system.

SUMMARY OF THE INVENTION

According to the present invention, a support for the optical system of a copy duplicator machine is formed with a relatively massive and rigid construction and mounted or suspended within the main frame of the copy duplicator machine in such a way that normal twisting and distorting of the main frame is not transmitted as distortion of the optical system.

DESCRIPTION OF THE DRAWINGS

FIG. 1 is a side elevational view of a copy duplicator machine with the optical system constructed and supported therein according to this invention;

FIG. 2 is an end view with portions broken away, of the machine of FIG. 1;

DESCRIPTION OF THE PREFERRED EMBODIMENTS

Figure 3:
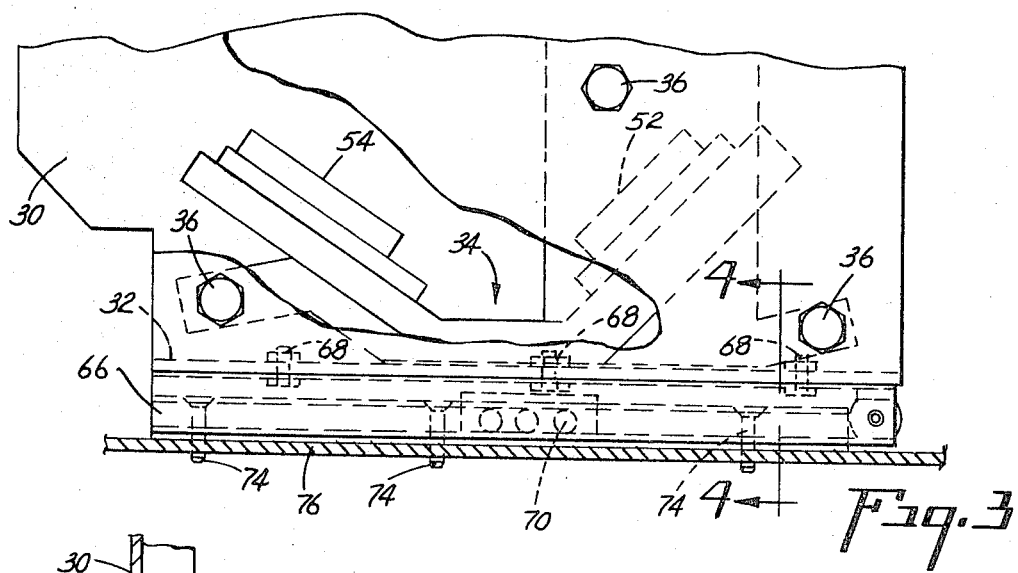
FIG. 3 is a detailed side elevational view of the mounting of the optical system with parts broken away for clarity.

Referring now to the drawings, and for the present to FIGS. 1 and 2, a copy duplicator machine which embodies the mounting of optical system according to the present invention is shown. The copy duplicator machine includes a main frame 10 which mounts and supports all of the components necessary for the copy duplicating function. The main frame 10 is of bar and panel construction which inherently has a certain amount of flexibility or resiliency, i.e., it is not formed of massive components or of a relatively rigid construction, but rather will distort under stress. The frame 10 includes a lower support carriage designated generally as 12 which is the principal supporting structure for all of the elements of the machine and which may be configured with sliding doors 14 to provide access to the interior for storage of materials. The support carriage 12 is mounted on casters 16 so that the machine may be freely moved from one position to another.

The main frame 10 also includes an upper housing 18 secured to the support carriage 12 in which are mounted the various components to perform the copy duplicating function of the machine. These components, to perform the various functions, include an optical system and support therefor, designated generally as 20, as well as various other components, some of which are shown schematically. For example, a master sheet feed section 22 is provided which feeds the master sheets to a sensitizing station 24, which in turn feeds the master sheet to the optical section where scanning and image projection to expose the master takes place. Following exposure, the master is delivered to a developing station generally designated as 26. From the developing station, the master is fed to a printing head contained in an area designated by reference 28.

One of the requirements of the optical system 20 is that, once the system has been properly focused and adjusted, it must be maintained in the precise adjusted position and cannot be subject to later distortional movement. Any such distortional movement, even to a small degree, can cause substantial undesirable changes in the focusing and adjustment of the system, and hence must be avoided. However, as was indicated above and can be seen in FIGS. 1 and 2, the frame 10 is not a massive frame structure nor of rigid construction but rather somewhat flexible in that it will distort under stress. Hence, when the machine is moved the weight of the machine will tend to cause distortion thereof. Therefore, the optical system support 20 is itself made of relatively massive components, with a rigid, compact, relatively non-deforming construction. The optical system support 20 is then supported within the upper housing 18 of the main frame 10 in such a manner that twisting or distortional movement of the main frame will not be transmitted as distortional movement to the optical system.

Details of one particular arrangement of an optical system and support are shown in copending application entitled, "Optical System" Ser. No. 38,028, filed May 18, 1970. This patent application shows how an optical system and support can be constructed and arranged for focusing such an optical system that is preferably utilized in the present invention. However, other optical system arrangements could be used so the specific arrangement of the optics of the system will not be discussed herein, but rather the rigid compact relatively deformation free nature of the construction of the system support will be described.

The optical system support utilized in the present invention includes a pair of thick rigid steel side plates 30 each having turned under flanges 32 at the lower edges thereof. A mirror and lens mounting structure 34 is provided which also is of massive rigid construction, in this case heavy castings, and is secured to the side plates 30 by means of bolts 36 passing through the side plates 30 and threadably engaging the casting of the structure 34. As can best be seen in FIG. 3, three bolts 36 are triangularly spaced on one side to form a stable structure. (The opposite side is similarly bolted). This connection of the lens and mirror mounting structure 34 to the side plates 30 forms a compact relatively rigid optical system support which will resist deformation under normal stresses.

An upper plate 40 between plates 30 supports the apparatus defining the scanning station designated generally as 42. The scanning station 42 includes entrance and exit sets of rolls 44 and 46 disposed to drive an original sheet past an object plane defined by a glass plate 48.

A lens 50 and mirrors 52 and 54 carried by the mirror and lens mounting structure 34 and arranged to project an image from the scanning station 42 to an exposure station 56.

The exposure station 56 includes an entrance set of master sheet drive rolls 58 and an exit set of master sheet drive rolls 60, and a second glass plate 62 defining an image plane, all secured to the side plates 30.

The exposure station 56 is adapted to receive sensitized masters from a receiving rack 64 mounted on the side plates 30 which in turn has received the master from the sensitizing station 24, which is mounted on the upper housing 18. The roll sets 58 and 60 drive the master past the exposure station 56 and deliver it to the developing station 26 mounted on the upper housing 18. Thus, the optical system includes the scanning station 42, the lens and mirror mounting structure 34, the exposure station 56 and the receiving rack 64.

Figure 4:
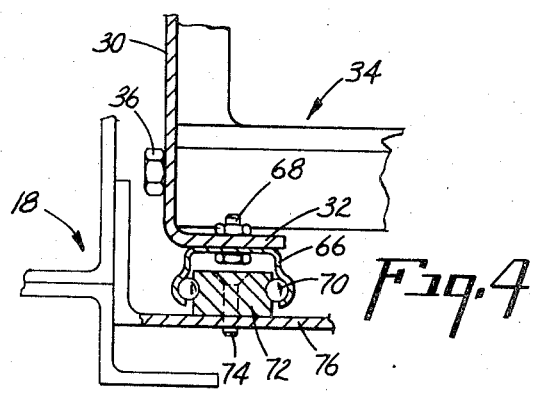
FIG. 4 is a partial section and elevational view of the mounting of the optical system on one of the tracks.

The optical system is mounted on the upper housing 18 by means of a pair of slide members 66, secured to the flanges 32 of the side plates by means of nuts and bolts 68. The slide members extend downwardly from the flanges 32 and are provided with ball bearings 70 which rollingly engage track members 72, which are secured by screws 74 to plate member 76 forming a part of the upper housing 18. As can be seen in FIG. 4, the slide members 66 are made of a lighter gauge material than the side plates 30 and also, there is space between the top of the track members 72 and the slide members 66. Further, the bearing mounting inherently has a certain amount of looseness. Additionally, the only engagement of the optical system 20 with the main frame 10 is through the yieldable connection of slide members 66 and ball bearings 70, there being no solid welded or bolted non-yieldable interconnection between the optical system 20 and the main frame 10.

This type of mounting of the optical system 20 in the upper housing 18 serves two specific functions. First, this type of mounting allows the main frame 10 to distort or twist without causing a corresponding twisting or distortion of the optical system support 20. The distortion or twisting of the main frame is taken up or absorbed by the slide member and track member mounting of the optical system on the main frame. While twisting or distorting of the main frame 10 may to a certain extent move the optical system 20 as a unit, either up or down or sideways, or even canting it one way or the other i.e. the interconnection is fully yieldable in all planes, the optical system itself will maintain its structural integrity during this movement as a unit, and hence the focusing and adjustment of the lenses and mirrors will not be disturbed. This freedom to move while avoiding distortion is accomplished by means of the relatively rigid massive structural elements and structural integrity of the optical system per se in conjunction with the loose fitting and lighter gauge material mounting thereof to absorb torsional movement of the main frame yet permit movement of the optical system as a unit where necessary in response to torsional movement of the main frame 10. In essence, the mounting of the optical system is more yieldable than the optical system support per se, and thus the optical system will move when movement is forced, as a unit rather than twisting.

Figure 5:
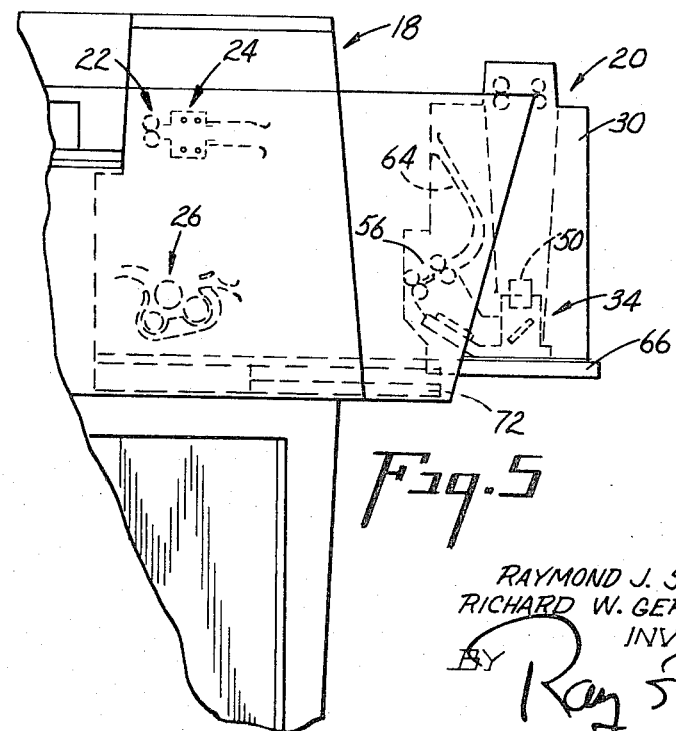
FIG. 5 is a partial side elevational view of the machine, with the supported optical system retracted from the machine.

The track, slide, and ball bearing mounting of the optical system also allows the system to be withdrawn from the machine to a location where a malfunction can be easily cleared. If for some reason a malfunctioning of the machine should occur, the optical system may merely be slid from the confines of the housing 18 to the position shown in FIG. 5. This exposes the optical system for easy access thereto to perform any necessary work. Once the necessary work has been performed, the optical system 20 can be slid back into the machine into position shown in FIG. 1. In order to assure that the optical system remains in the proper position, suitable catches and stop means (not shown) can be provided to allow proper positioning and location of the optical system, both within and out of the confines of the upper housing 18.

What is claimed is:

1. A photocopying machine comprising a relatively flexible main frame structure, a rigid secondary frame structure supported by said main frame structure and having substantially greater resistance to flexing than said main frame structure, a sensitizing station disposed on said main frame structure, means at said sensitizing station for sensitizing master sheets, an exposure station disposed on said secondary frame structure, means for conducting sensitized master sheets from said sensitizing station on said main frame structure to said exposure station on said secondary frame structure, means at said exposure station for enabling sensitized master sheets to be exposed to an image, a developing station disposed on said main frame structure, means for conducting exposed master sheets from said exposure station on said secondary frame structure to said developing station on said main frame structure, a scanning station disposed on said secondary frame structure, means for moving an original sheet to and from said scanning station, optical means disposed on said secondary frame structure for projecting an image of at least a portion of an original sheet disposed at said scanning station to a sensitized master sheet disposed at said exposure station, said optical means including lens means for focusing the projected image, and connector means for mounting said secondary frame structure on said main frame structure and for enabling said secondary frame structure to move as a rigid unit relative to said main frame structure while being supported by said main frame structure upon the occurrence of flexing in said main frame structure to prevent distortion of said secondary frame structure and a resulting impairment of the focusing by said lens means of the projected image.

2. A photocopying machine as set forth in claim 1 wherein said means for conducting sensitized master sheets from said sensitizing station to said exposure station includes first guide means connected to said main frame structure for guiding movement of master sheets from said sensitizing station toward said exposure station and second guide means connected to said secondary frame structure for guiding movement of master sheets received from said first guide means to said exposure station, said first and second guide means being operatively interconnected in such a manner as to allow said secondary frame structure to move relative to said main frame structure upon the occurrence of flexing in said main frame structure.

3. A photocopying machine as set forth in claim 1 wherein said means for conducting exposed master sheets from said exposure station to said developing station includes first guide means connected to said secondary frame structure for guiding movement of exposed master sheets from said exposure station toward said developing station and second guide means connected to said main frame structure for guiding movement of exposed master sheets received from said first guide means to said developing station, said first and second guide means being operatively interconnected in such a manner as to allow said secondary frame structure to move relative to said main frame structure upon the occurrence of flexing in said main frame structure.

4. A photocopying machine as set forth in claim 1 wherein said connector means includes track means connected with said main frame structure and slide means connected with said secondary frame structure and disposed in sliding engagement with said track means, said slide means having a substantially smaller resistance to flexing than said secondary frame structure to retard the transmittal of movement from said main frame structure to said secondary frame structure.

5. A photocopying machine comprising a relatively flexible main frame structure, a rigid secondary frame structure supported by said main frame structure and having substantially greater resistance to flexing than said main frame structure, a sensitizing station disposed on said main frame structure, means at said sensitizing station for sensitizing master sheets, an exposure station disposed on said secondary frame structure, means for conducting sensitized master sheets from said sensitizing station on said main frame structure to said exposure station on said secondary frame structure, said means for conducting sensitized sheets from said sensitizing station to said exposure station including first guide means connected to said main frame structure for guiding movement of master sheets from said sensitizing station toward said exposure station and second guide means connected to said secondary frame structure and movable therewith relative to said main frame structure for guiding movement of master sheets received from said first guide means to said exposure station, means at said exposure station for enabling sensitized master sheets to be exposed to an image, a developing station disposed on said main frame structure, means for conducting exposed master sheets from said exposure station on said secondary frame structure to said developing station on said main frame structure, said means for conducting exposed master sheets from said exposure station to said developing station including third guide means mounted on said secondary frame structure and movable therewith relative to said main frame structure for guiding movement of exposed master sheets from said exposure station toward said developing station and fourth guide means connected to said main frame structure for guiding movement of exposed master sheets received from said first guide means to said developing station, a scanning station disposed on said secondary frame structure, means for moving an original sheet to and from said scanning station, optical means disposed on said secondary frame structure for projecting an image of at least a portion of an original sheet disposed at said scanning station to a sensitized master sheet disposed at said exposure station, said optical means including lens means for focusing the projected image, and track means for mounting said secondary frame structure on said main frame structure to enable said secondary frame structure to be moved from an operating position in which said second guide means is adjacent to said first guide means and third guide means is adjacent to said fourth guide means to an inactive position in which said second and third guide means are spaced from said first and fourth guide means, said track means including means for enabling said secondary frame structure to move as a rigid unit relative to said main frame structure while being supported by said main frame structure upon the occurrence of flexing in said main frame structure to prevent distortion of said secondary frame structure and a resulting impairment of the focusing by said lens means of the projected image.

* * * * *